United States Patent
Villarreal-Trevino

[19]

[11] Patent Number: 6,132,489

[45] Date of Patent: Oct. 17, 2000

[54] METHOD AND APPARATUS FOR REDUCING IRON-OXIDES-PARTICLES HAVING A BROAD RANGE OF SIZES

[75] Inventor: Juan A. Villarreal-Trevino, Guadalupe, Mexico

[73] Assignee: Hylsa, S.A. de C.V., San Nicolas de los Garza, Mexico

[21] Appl. No.: 09/165,985

[22] Filed: Oct. 2, 1998

Related U.S. Application Data

[60] Provisional application No. 60/091,869, Jul. 6, 1998, and provisional application No. 60/093,103, Jul. 16, 1998.

[51] Int. Cl.[7] ................................... C21B 13/02
[52] U.S. Cl. .................. 75/444; 75/451; 75/488; 75/505; 266/172
[58] Field of Search ................. 75/444, 447, 448, 75/449, 451, 488, 505; 266/172

[56] References Cited

U.S. PATENT DOCUMENTS

| | | | |
|---|---|---|---|
| 3,917,480 | 11/1975 | Malgarini et al. | 75/26 |
| 3,928,021 | 12/1975 | Matsubara et al. | 75/448 |
| 3,936,296 | 2/1976 | Campbell | 75/26 |
| 4,082,545 | 4/1978 | Malgarini et al. | 75/35 |
| 4,886,246 | 12/1989 | Maeda et al. | 266/157 |
| 4,978,387 | 12/1990 | Kepplinger | 75/445 |
| 5,082,251 | 1/1992 | Whipp | 266/142 |
| 5,185,032 | 2/1993 | Whipp | 75/436 |
| 5,370,727 | 12/1994 | Whipp | 75/436 |
| 5,435,831 | 7/1995 | Meissner | 75/444 |
| 5,529,291 | 6/1996 | Meissner | 266/156 |
| 5,545,251 | 8/1996 | Knop | 75/444 |
| 5,560,762 | 10/1996 | Bresser et al. | 75/447 |
| 5,584,910 | 12/1996 | Kepplinger et al. | 75/445 |
| 5,762,681 | 6/1998 | Lee et al. | 75/446 |

*Primary Examiner*—Melvyn Andrews
*Attorney, Agent, or Firm*—A. Thomas S. Safford; Frommer Lawrence & Haug LLP

[57] ABSTRACT

The present invention describes a method and apparatus for the reduction into metallic iron of iron-oxides-containing particles having a broad range of sizes. Particles, preferably within a broad range of sizes smaller than about 3.2 mm, are reduced by contact with a hot reducing gas, preferably mainly composed of hydrogen and within a temperature range of 700 to 750° C. The reducing gas flows through a descending moving bed of coarser particles and forms an ascending fluidized bed of fines, all in a single reduction reactor, where the particles charged to the reactor are fed into the lower portion of the fluidized bed and the reduced fines are withdrawn from the reactor from the upper portion of the fluidized bed.

26 Claims, 3 Drawing Sheets

METHOD AND APPARATUS FOR REDUCING IRON-OXIDES-PARTICLES HAVING A BROAD RANGE OF SIZES

This application claims benefit of provisional application Ser. No. 60/091,869 filed Jul. 6, 1998, and a provision of Ser. No. 60/093,103 filed Jul. 16, 1998.

FIELD OF THE INVENTION

The present invention describes a method and apparatus for the production of reduced iron ore, sponge iron (more commonly now referred to as Direct Reduced Iron or merely DRI), or the like, in an ironmaking plant wherein the charge of iron-oxide-containing particles fed to the reduction reactor can be in a form inclusive of fines. The invention in a preferred aspect particularly provides process and apparatus which produce DRI, utilizing iron ore particles having a broad range of sizes without the necessity of prior screening or other separation methods to prevent poor performance of the shaft reactor (through uneven reduction and loss of product fines). These methods and apparatus are particularly suitable for friable iron ore of the type which has a significant tendency to break apart and degrade during the reduction stage, causing clogging in the bed of particles in a moving bed reactor, resulting in disrupted gas flow patterns and consequent uneven reduction.

BACKGROUND OF THE INVENTION

Direct reduction plants for producing direct reduced iron, known as DRI or sponge iron, hot briquetted iron, or the like, (in general pre-reduced materials useful as feedstocks for iron and steelmaking), currently produce DRI by reacting a reducing gas, composed principally of hydrogen and carbon monoxide, at temperatures in the range of 750 to 1050° C., with a bed of particulate iron-containing material. Since the handling of feed materials produce variable quantities of iron ore fines, there has been a constant search for methods and apparatus which avoid the problems of processing fines in a conventional reactor shaft. Several inventions have been proposed including the previous separation of fines present in the feedstock (usually by means of a screen) and their subsequent reduction usually in fluidized bed reactors.

DESCRIPTION OF THE PRIOR ART

The prior art discloses methods and apparatus for reducing iron ore in the form of pellets and/or lumps in a single reactor usually a vertical shaft furnace. These particles form a bed of iron-containing material which may be static (fixed bed) or may be descending by gravity (moving bed) within a reduction reactor. Examples of such processes are described in U.S. Pat. Nos. 3,749,386; 3,764,123; 3,816,101; 4,336,063; 4,428,072; 4,556,417; 5,078,787; 4,046,557; 4,002,422 and 4,375,983. These and the other patents or patent applications cited in this application and their content are incorporated by reference.

It is well known to those skilled in the art that fines cause several problems when introduced into or produced in a moving bed reactor.

U.S. Pat. No. 5,435,831 to Meissner shows a process capable of producing direct reduced iron from pellets, lumps and fines of iron oxide. Before being reduced, the fines are separated from the pellets and lumps. Subsequently the pellets and lumps are introduced to a shaft furnace where reduction takes place in a manner known in the art. Even though this process can reduce lumps and pellets, as well as fines, it involves the combination of two systems using two types of reactors. Fines of the feedstock are separated by means of a screen. The fines are processed in fluidized bed reactors, while the coarse particles are reduced in a conventional moving bed reactor. U.S. Pat. No. 5,435,831 discloses that if fines are introduced directly to the shaft reduction furnace, the fines would be blown out into the scrubber for separation from the gas stream. Thus, this patent contemplates the very condition addressed by the present invention, but teaches away from the present invention and does not even mention the desired reduction of said fines within said shaft furnace.

U.S. Pat. No. 4,886,246 to Maeda et al. describes a prereduction reactor for achieving up to 30% reduction of iron ore particles having a broad range of sizes; for example, with a content of from about 2% larger than 10 mm and about 49% smaller than 0.5 mm. The final reduction and melting to metallic iron is completed in a separate melter-gasifier. A relatively low grade reducing gas, produced in the melter-gasifier and having a composition for example of $H_2$: 14%; CO: 39%; $CO_2$: 21%; $H_2O$: 12% and $N_2$: 14%, is fed to the pre-reduction reactor through a distributor at the bottom of said pre-reduction reactor. The velocity of the reducing gas and the shape of the reactor are such that from the full charge of particles fed to the top portion of the reactor, the medium sized and the coarsest particles both settle downwardly through a fluidized zone, countercurrent to the upflowing reducing gas, to be withdrawn through preferably one conduit at the bottom of said prereduction reactor. The lightest fines are carried over in the partially-spent reducing gas from the top of the reactor into a cyclone separator, which recycles enough of the fines to the reactor to assure sufficient reduction and draws off a portion of the fines for delivery to the melter-gasifier separate from the delivery of the medium sized and the coarsest particles to the same melter-gasifier.

U.S. Pat. No. 5,762,681 to Lee et al. teaches a method and apparatus for reducing a relatively wide variety of sizes of iron ore fines into metallic iron, which includes a drying/preheating furnace, a primary reduction furnace and two secondary reduction furnaces (one being a high-gas-velocity rector for handling the heavier fines, and the other being a low-gas-velocity rector for handling the lighter fines). This process does not teach use of a moving bed reactor.

U.S. Pat. No. 5,529,291 to Meissner describes a system to process fines as feed material. Meissner shows multiple circulating fluidized beds connected in series capable of reducing iron oxides in the form of fines to metallic iron. No reference was found in this patent's teaching of the processing of fines and coarse particles in a single continuous reactor.

U.S. Pat. No. 5,545,251 to Knopp teaches a system of processing fines in a fluidized bed horizontal reactor. In this system, the iron ore fines blown into the reactor and heated therein by means of coil heat exchangers, passing through successive sections forming fluidized beds separated by partial partitions with intercommunications at the top of the horizontal reactor. The fines overflow the partitions passing from one section to another and finally over the last partition, which defines the sponge iron collecting section. This system assertedly represents an improvement in gas utilization and temperature control of each section forming the horizontal reactor. When particles larger than the range of design are fed into the reactor, said particles cannot overflow from one section to another with the same rate of air supplied, so this rate has to be controlled and regulated to achieve the desired performance of the equipment.

U.S. Pat. No. 5,560,762 to Bresser et al. describes a system using a fluidized bed in a horizontal rectangular reactor. This system has the advantage of recycling the fine particles carried out by the off gas, to the reduction zone, assuring the complete reduction of the fine particles. This invention describes a reactor wherein particles have to overflow the weirs inside to pass through the different chambers.

Other prior art references employing fluidized bed reactors for reduction processing of iron ore fines are: U.S. Pat. No. 3,936,296 to Campbell; U.S. Pat. Nos. 5,082,251 and U.S. Pat. No. 5,370,727 both to Whipp and U.S. Pat. No. 5,584,910 to Kepplinger et al.

It has long been desired to have a direct reduction process wherein an iron ore charge with both coarse and fine particles could be processed in one single reactor shaft continuously to achieve high metallization rates.

SUMMARY OF THE INVENTION

It is therefore an object of the present invention to provide a method and an apparatus for reducing iron oxide particles having a broad range of sizes in a single reduction reactor, particularly to a high degree of metallization.

Other objects and advantages of the invention will be evident to those skilled in the art or will be described in this specification of the invention and appended drawings.

According to the present invention, the objects thereof are achieved by providing method and apparatus for producing direct reduced iron by contacting iron-oxide-particles, particularly iron ore fines, in a broad range of sizes with a reducing gas in a reduction reactor having a reduction zone. The reduction zone comprises at least two sub-zones, the first sub-zone being a fluidized bed of ascending fines and the second sub-zone being a non-fluidized moving bed of descending coarser particles. A stream of hot reducing gas, comprising hydrogen and carbon monoxide as reducing agents produced in a manner known in the art, preferably in a temperature range from 700° C. to 750° C., is supplied to the lower portion of the moving bed through a gas distributor, which thereby defines the bottom of the second reduction sub-zone and serves as the fluidizing medium in the first reduction sub-zone. The gas distributor may preferably be located to extend into the reduction reactor to give uniform fluidization of the smaller particles in the first reduction sub-zone. The iron-oxide-particles are fed into the reactor at or near the interface between the fluidized bed and the moving bed (e.g. preferably into the lower portion of the fluidized bed in the first sub-zone and just above the moving bed in the second sub-zone). The upper limit of the fluidized bed is set by the take-off conduit skimming off the reduced fines that "boil" up from the fluidized bed and overflow therein. The charging of the iron ore particulates to the bottom of the fluidized bed and the discharge of the reduced fines from the top of the fluidized bed can be offset on opposite sides of the reactor, such that there is a cross flow component added to the overall upflow of the fluidized fines, resulting in still longer residence time for such fines (allowing for more complete reduction to give over 90% reduction, thus avoiding the series of cascading fluidized beds so typically required by the prior art to achieve the same degree of reduction). The rate of skimming removal of fluidized particles from the reactor can be adjusted by conduit sizing or even valving as another way to adjust favorably the residence time of the fines in the fluidized bed. To allow the desirable "height" of the moving bed to be above said distributor, sensing means may be installed and connected to control the feeding of iron ore to the reduction zone. Adjusting the height of the moving bed affects the height of the fluidized bed and thus the residence time of the fluidized particles. The velocity of the reducing gas can also affect these same factors. Said reducing gas preferably has a velocity typical in the art for maintaining DRI fluidized beds, which, for example, normally is at least capable of maintaining in the fluidized state those particles having a size approximately 1.0 mm or below, said particles usually being called the fines. The majority of the reducing gas components when fed to the reactor should be reducing gases ideally with at least a third more hydrogen than carbon monoxide, which again serves to assure more complete reduction of the fluidized fines for a given residence time. The coarse particles (usually larger than 1.0 mm) which form the moving bed react with the reducing gas and continue to be processed in a manner known in the art. As known in the art, this size division between the moving bed and the fluidized bed particles can vary somewhat in practice. The fluidized bed is designed to have a residence time sufficient to allow the desired reduction of the iron-ore (preferably well over 50% and more typically on the order of at least 90%, with a prefered metallization of over 95%). The fine particles are collected after their reduction and sent via a conduit at least initially separate from the discharge stream of said coarse reduced particles, but preferably to be joined with the discharge stream of said coarse reduced particles such that the combined reduced particles are handled thereafter in one or more of the several manners known in the art. To improve the downstream flow of the coarse reduced particles, a stream of a suitable gas could be injected to each discharge zone of the reactor. The hot reducing gas after reacting with the iron-oxides-ore is withdrawn from the reactor from above the fluidized bed as the off gas. Said off gas can still contain the lighter fines. The lighter fines with a size above about 0.1 mm are separated in a solid particles separator (normally a cyclone separator) and are recycled to the reduction zone (to eventually accumulate sufficiently to be discharge from the reactor along with the other fines form the fluidized bed). The fines with size below 0.1 mm can be separated in a second solid particles separator connected to the exiting gas of the first solids separator. These lightest particles are withdrawn from the system and can be sent to a micropelletizing system or for another treatment and then be recycled to the reduction zone; or can be sent for disposal. Once the reduced material is discharged, it can be cooled, hot briquetted or otherwise treated in a manner known in the art to best fit the necessities of the site. To increase efficiency, the off gas can be fed to a preheater to warm the particles charged to the reactor.

The present invention can perform in reduction systems working under high pressures as well as low or atmospheric pressure operating systems.

BRIEF DESCRIPTION OF THE DRAWINGS

In this specification and in the accompanying drawings, some preferred embodiments of the invention are shown and described and various alternatives and modifications thereof have been suggested; but it is to be understood that these are not intended to be exhaustive and that many changes and modifications can be made within the scope of the invention. The suggestions herein are selected and included for purposes of illustration in order that others skilled in the art will more fully understand the invention and the principles thereof and will thus be enabled to modify it in a variety of forms, each as may be best suited to the conditions of a particular use.

DETAILED DESCRIPTION OF PREFERRED EMBODIMENTS OF THE INVENTION

Figure 1:
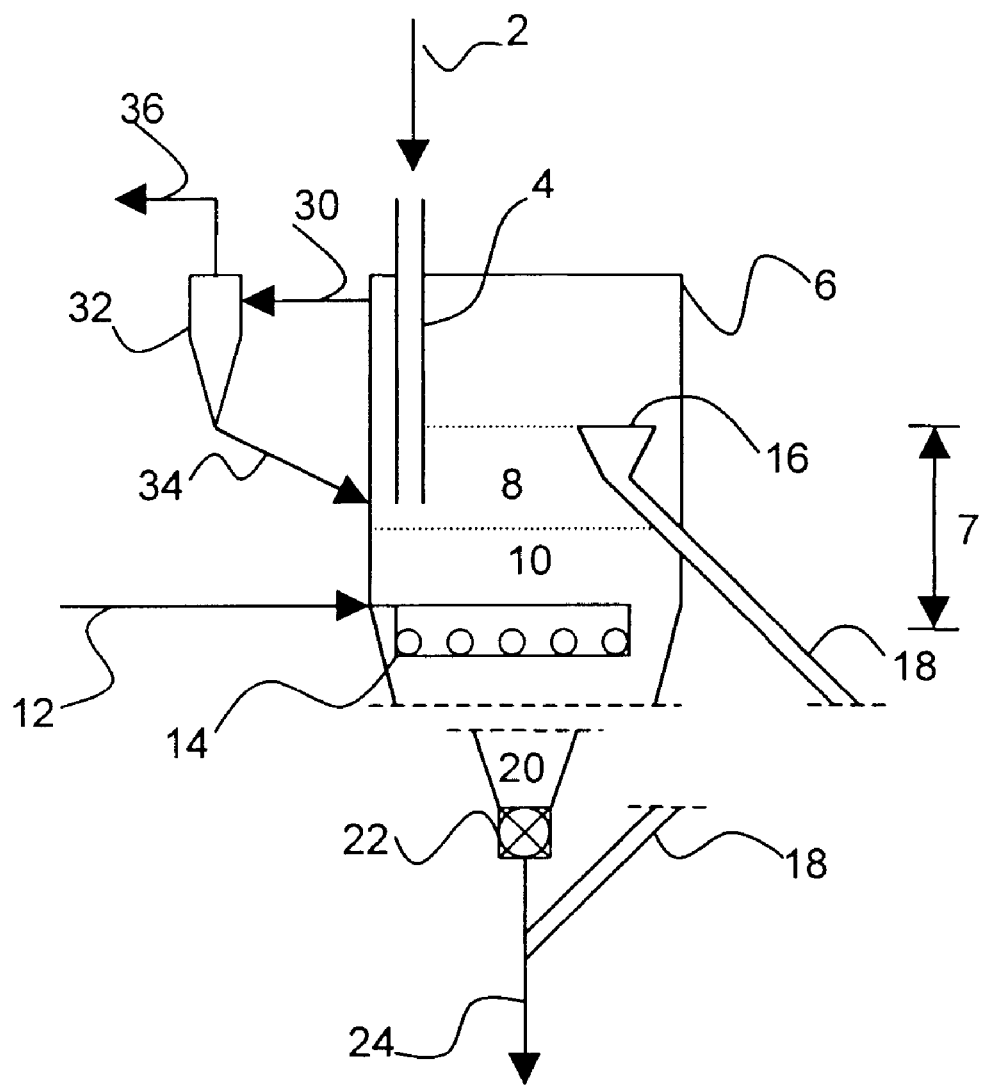
FIG. 1 shows schematically a preferred embodiment of the present invention, illustrating the dual zone moving bed/fluidized bed feature of the invention process and apparatus for producing DRI.

FIG. 1 shows schematically a preferred embodiment of the invention. The iron-oxide-ore fines 2 are fed through conduit means 4 to the reduction zone of a reduction reactor 6. Said reduction zone 7 comprises a fluidized bed 8 (the first reduction sub-zone), that portion 10 of the moving bed above the discharge zone 20 (the second reduction subzone), and a gas distributor 14 preferably located to extend into the reduction reactor 6. Said gas distributor 14 is supplied with a reducing gas stream 12 from a producing and/or recycling system (preferably such as system 108, described below, or the alternative earlier systems described in the patents cited above; for example, U.S. Pat. Nos. 4,336,063 and 4,528,030, among others). The coarse material comprising particles bigger than on the order of 1 mm forms the moving bed 10. Said moving bed flows downwardly through at least one discharge zone 20. The gas exiting said reduction zone 7 of the reduction reactor 6 as reactor off gas stream 30, is treated in the solids separator 32 usually a cyclone, where solid particles bigger than on the order of 0.1 mm return to the system through conduit means 34. The cyclone off gas 36 is sent for a subsequent treatment (such as in system 108, etc.). Reduced coarse particles pass through a dosification means 22 (such as in U.S. Pat. Nos. 3,710,808 and 4,427,136 and WO 97/35130) and on to a discharge stream 24. The particles comprising the fluidized bed 8 after being preferably substantially reduced, are collected by collecting means 16 (shown as an upwardly open funnel) and then are conducted downward through conduit means 18 preferably to join the discharge stream 24 together with said coarse particles.

Figure 2:
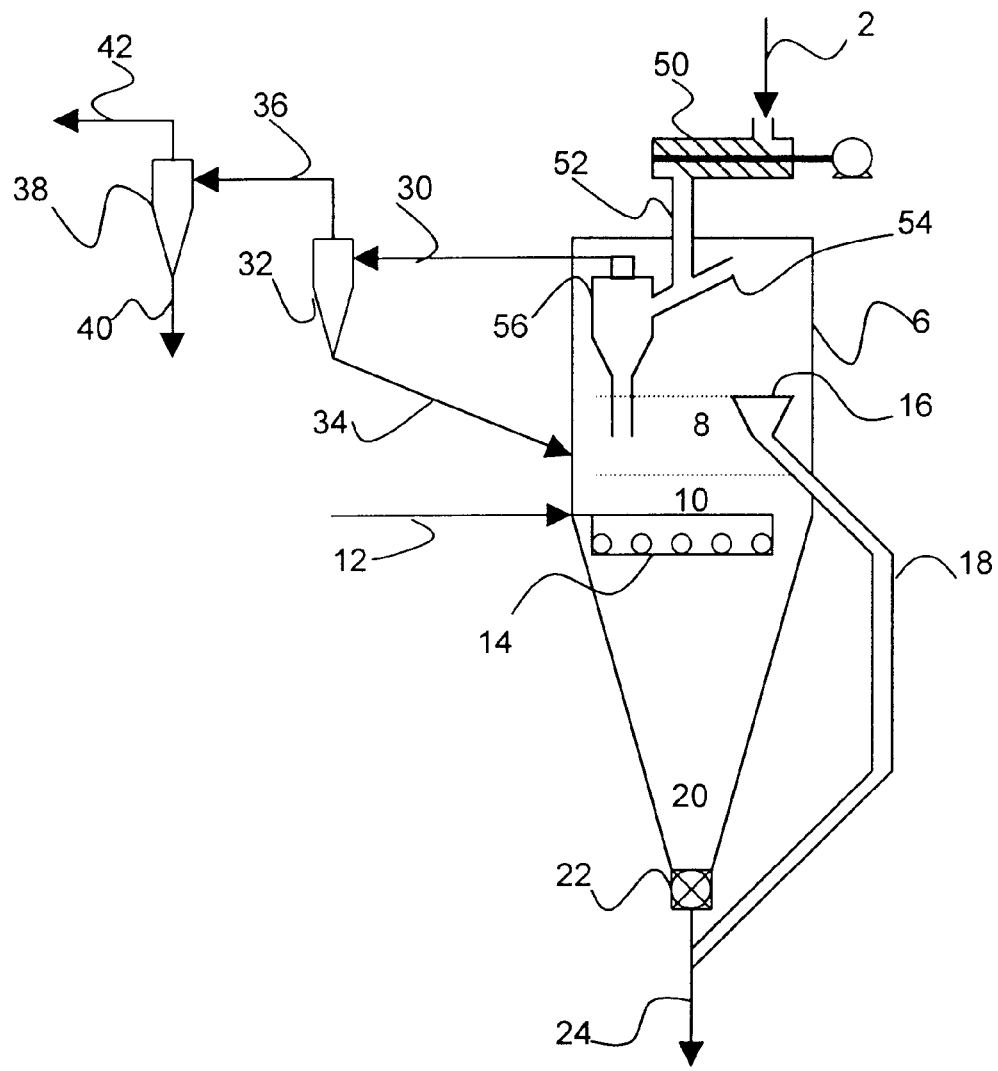
FIG. 2 shows schematically an alternative preferred embodiment of the present invention, similar to FIG. 1 but with a modification including a screw feed mechanism and a pre-heater.

FIG. 2 schematically shows another embodiment of the present invention based on FIG. 1, where the iron-oxide-containing particles 2 are fed by means of a screw feeder 50 through conduit means 52 to the reduction reactor 6. The conduit means 52 has a gas entrance 54 to let the off reducing gas (from above the fluidized bed 8) contact and thus pre-heat the particles. Conduit means 52 is connected to a preheater 56 usually in form of a cyclone, which promotes intimate contact and subsequent separation the off reducing gas and the particles, ultimately discharging said particles into the reduction zone 7 in the single reactor. The reduction zone 7 comprises a fluidized bed 8 which is typically formed by particles up to 1 mm and a moving bed 10 formed by coarse particles typically larger than 1 mm. A gas distributor 14 is preferably located to extend into the moving bed 10 to distribute the reducing gas necessary to reduce the iron-oxide-ore particles into sponge iron and to maintain the fluidized bed 8. Said gas distributor 14 is supplied with a reducing gas stream 12 mainly comprising hydrogen and carbon monoxide as reducing agents, but preferably composed mainly of hydrogen. The coarse material comprising particles bigger than 1 mm forming the moving bed 10 is reduced by its contact with reducing gas and then flows downwardly through at least one discharge zone 20. Reduced coarse particles pass through dosification means 22 and then are discharged as stream 24. The particles comprising the fluidized bed 8 after being at least partially reduced, are collected by funnel 16 and then conducted downwardly through conduit means 18 to discharge into stream 24 together with said coarse particles from the moving bed. The gas exiting preheater 56 as stream 30 is treated in the solids separator 32 where solid particles bigger than 0.1 mm return to the system through conduit means 34. The cyclone off gas 36 from the first solids separator, first cyclone 32, passes to a second solids separator, second cyclone 38 where particles below 0.1 mm are sent via discharge conduit 40 for other treatment (such micropelletizing) or disposal. The clean off gas 42 is conducted to a system to produce and/or recycle reducing gas (such as system 108, etc.).

Figure 3:
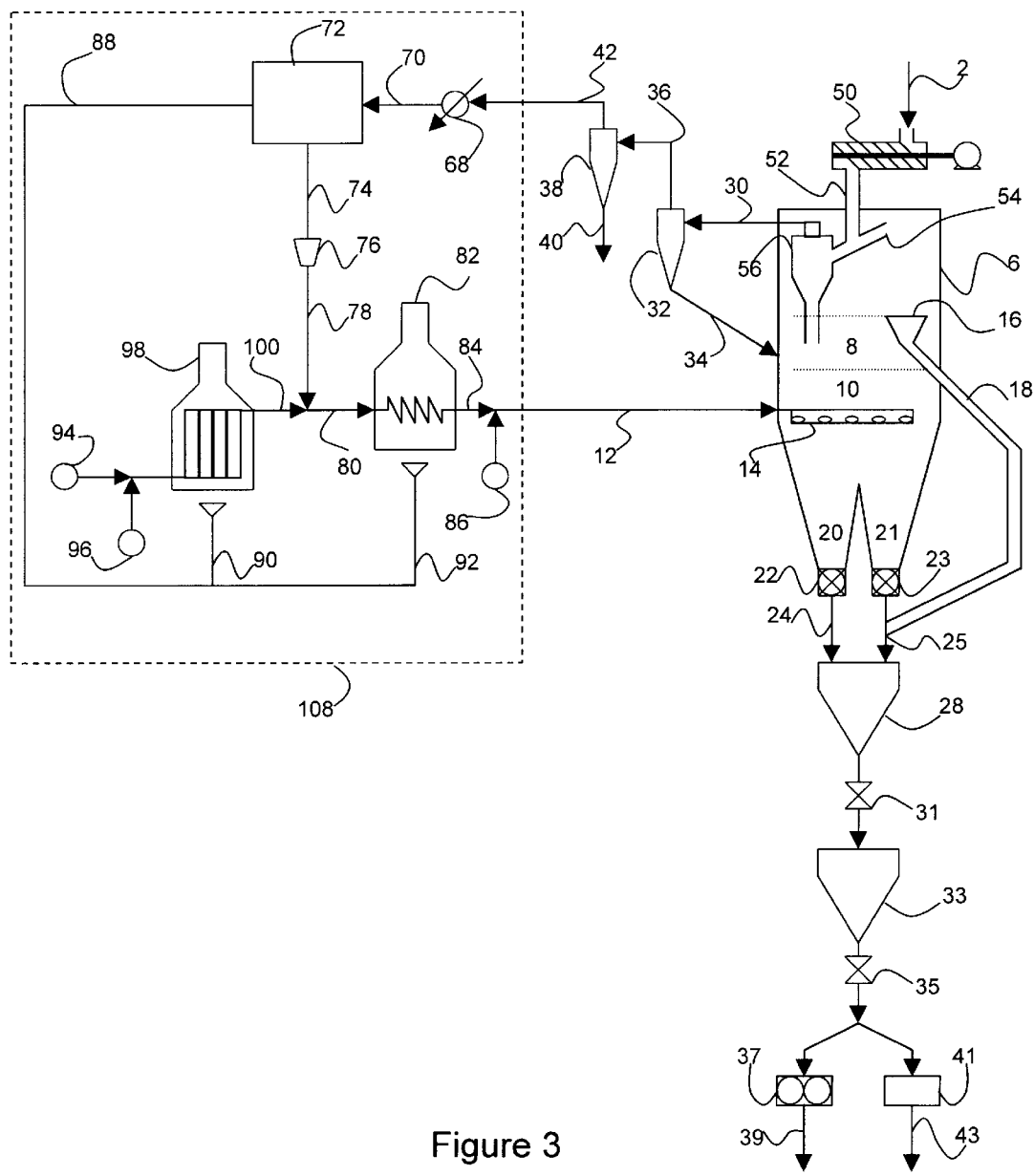
FIG. 3 shows schematically still another alternative preferred embodiment of the present invention, similar to FIG. 2 but with two discharge zones and an example of one of many reducing gas sources and recycle systems.

FIG. 3 schematically shows another preferred embodiment (which also shows exemplary peripheral equipment for discharge (28 et seq.) and for reforming gas production and/or recycle (108), that can be used with any of the embodiments in FIGS. 1 and 2 as well). This differs particularly from of the embodiment shown in FIG. 2 by the coarse reduced particles being discharged through two discharge zones 20 and 21 respectively. Each discharge zone has its own dosification means 22 and 23 respectively which in turn discharge through conduit means 24 and 25 respectively to a common hopper 28. From hopper 28, the reduced material passes through valve means 31 and is discharged to hopper 33, which with valve means 31 and 35 forms a depressurization discharge system. After this latter system, the reduced material can be sent to a hot briquetting system 37 to produce hot briquetted iron 39, or can be sent to a cooling system 41 to discharge the cooled sponge iron 43 to the ambient atmosphere, or can be discharged directly still hot to refining equipment, or otherwise (all in a manner known in the art).

Described hereinafter is the reducing gas producing and recycling system 108. The off reducing gas stream 42 of the second cyclone separator 38, passes through a cooling and cleaning system 68 (typically a water quench cooler) and then passes on via conduit 70 through a hydrogen separator system 72. The hydrogen separator system is preferably of the type with pressure swing adsorption or vacuum pressure swing adsorption (referred as PSA and VSA respectively; see for example provisional application Ser. No. 60/075, 313). The stream 74, comprised mainly of hydrogen, passes through compressor 76 and the resulting pressured stream 78 is combined with the make-up reducing gas stream 100 from reformer 98 to form stream 80. Stream 80 is heated by heater 82 to a temperature in the range from 650 to 750° C. to form stream 84. Stream 84 can be the same as stream 12, or optionally can be combined with an oxygen-containing gas stream 86 to raise the temperature of stream 84 from the heater 82, if required, prior to its introduction as stream 12 through gas distributor 14. The make up reducing gas stream 100 is formed by the combination of natural gas 94 and steam 96 and their reaction through gas reformer 98. The stream 88 with low hydrogen content exits the hydrogen separation unit 72 and can be used via conduits 90 and 92 to heat the reformer 98 and the heater 82, respectively.

What is claimed is:

1. A method for reducing iron-oxide to metallic iron by reacting iron oxide-containing-particles to metallic-iron-containing particles in a solid state with a reducing gas mainly composed of hydrogen, and having a broad range of sizes in a vertical reduction reactor having at least one reduction zone, wherein said particles form at least two types of beds: a fluidized bed and a moving bed; said method comprising:

(a) introducing said particles through at least one oxides-feeding pipe with its discharging end positioned within said fluidized bed;

(b) causing a reducing gas, at a temperature above about 700° C., to flow upwardly through said reduction zone at a regulated velocity so that said reducing gas forms a fluidized bed with a first portion of said particles and a non-fluidized bed, where the average size of particles of said first portion is smaller than the average size of particles of said second portion;

(c) causing said metallic-iron-containing particles to overflow from said fluidized bed and fall through at least one discharging pipe having an inlet end at the upper part of said fluidized bed and at a height above said discharging end of the oxides-feeding pipe;

(d) withdrawing metallic-iron-containing particles from said non-fluidized bed through at least one discharging pipe, positioned at a height below said discharging end of the oxides-feeding pipe; and, (e) withdrawing at least a portion of said reducing gas from said reduction zone through at least one gas outlet at a point above said collector pipe.

2. A method for reducing iron-oxides to metallic iron according to claim 1, wherein said fluidized bed is formed by particles between about 0.5 and about 3.2 mm and particles smaller than about 0.5 mm to about 0.1 mm forming said fluidized bed in said reduction zone.

3. A method for reducing iron-oxides to metallic iron according to claim 1, wherein the temperature of said reducing gas is in the range between about 700° C. to 750° C.

4. A method for reducing iron-oxides to metallic iron according to claim 1, wherein said reducing gas is mainly composed of hydrogen and carbon monoxide as reducing agents.

5. A method for reducing iron-oxides to metallic iron according to claim 1, wherein said reducing gas contains more than about 80% in volume of hydrogen as one of its components.

6. A method for reducing iron-oxides to metallic iron according to claim 1, wherein the residence time of said particles forming said fluidized bed is about 20 minutes.

7. A method for reducing iron-oxides to metallic iron according to claim 4, wherein the composition of said reducing gas is in a dry basis and volume: H2:50% to 60%; CO: 30% to 37%; CO2:2% to 3.5%; CH4:1% to 3%; N2:0% to 1.5% and the rest being other hydrocarbons and inert gases.

8. A method for reducing iron-oxides to metallic iron according to claim 4, wherein the composition of said reducing gas may also contain carbon monoxide and methane as its components.

9. A method for reducing iron-oxides to metallic iron according to claim 1, wherein said iron-containing particles are cooled at a temperature below to 100° C. before they are discharged from said reduction reactor by circulating a stream of cooling gas in contact with said iron-containing particles.

10. A method for reducing iron-oxides to metallic iron according to claim 1, wherein said reducing gas is produced by the combination of natural gas and steam in a steam reformer.

11. A method for reducing iron-oxides to metallic iron according to claim 1, wherein a portion of the effluent gas is recirculated to the reduction reactor.

12. A method for reducing iron-oxides to metallic iron according to claim 1, wherein said effluent gas is treated in a hydrogen separation unit and the subsequent recirculation of hydrogen to the reduction reactor as a portion of the reducing gas.

13. A method for reducing iron-oxides to metallic iron according to claim 12, wherein said hydrogen separation unit is a Pressure Swing Adsorption unit.

14. A method for reducing iron-oxides to metallic iron according to claim 12, wherein said hydrogen separation unit is a Vacuum Pressure Swing Adsorption unit.

15. A method for reducing iron-oxides to metallic iron according to claim 12, wherein said hydrogen separation unit is a Chemical Absorption unit.

16. A method for reducing iron-oxides to metallic iron according to claim 1, wherein particles separated from the effluent gas stream of said reduction zone are recirculated to said fluidized bed.

17. A method for reducing iron-oxides to metallic iron according to claim 1, wherein said iron-oxides containing particles are preheated by means of an internal cyclone within said reduction zone of the reduction reactor.

18. A method for reducing iron-oxides to metallic iron according to claim 1, wherein feeding said iron-oxides containing materials is by means of an external cyclone contacting said feeding materials with said effluent gas.

19. A method for reducing iron-oxides to metallic iron according to claim 1, wherein the rate if discharging particles from said non-fluidized bed is regulated so that the top level of said non-fluidized bed in said reduction zone is maintained at a predetermined level.

20. A method for reducing iron-oxides to metallic iron according to claim 1, wherein a suitable gas stream is injected to the discharging zone of particles that form said non-fluidized bed, to facilitate the downward flow of said particles through said reactor.

21. A method for reducing iron-oxides to metallic iron according to claim 1, wherein the discharging end of said feeding pipe and the inlet end of said discharging pipe are laterally widely separated whereby there results a cross flow of the fines in the fluidized stream in addition to the upflow thus increasing the residence time in the fluidized bed.

22. An apparatus for reducing iron-oxides to metallic iron by reacting iron-oxides-containing particles to metallic-iron-containing particles in a solid state with a reducing gas mainly composed of hydrogen, in a temperature range of about 700 to 750° C., and having a broad range of sizes smaller than about 3.2 mm, wherein said particles form at least two types of beds: a fluidized bed and a moving bed; said apparatus comprising:

(a) a vertical reduction reactor having a single reduction zone; an oxides-containing-particles feeding pipe having its discharging end within said reduction zone;

(b) a reducing gas inlet positioned below said discharging end of said feeding pipe; so as to cause said reducing gas to flow upwardly through the reduction zone;

(c) a metallic-iron-containing particles discharge pipe having an inlet end positioned at a height above said discharging end of said particles feeding pipe, so that said particles from said fluidized bed overflow and fall by gravity through said discharge pipe;

(d) at least one metallic-iron-containing particles discharge zone positioned at a height below said reducing gas inlet; and, (e) at least one reducing gas outlet in said reduction zone positioned above said inlet end of said first metallic-iron-containing particles discharge pipe.

23. An apparatus for reducing iron-oxides to metallic iron according to claim 22, also comprising a cyclone connected to said gas outlet, and conduit means for recycling particles separated from said reducing gas to said reduction zone.

24. An apparatus for reducing iron-oxides to metallic iron according to claim 22, also comprising a variable rate discharging device connected to said reactor discharging zone, for regulating the rate of discharge of said particles from said moving bed in said reduction zone, and its top level may be maintained at a predetermined height.

25. An apparatus for reducing iron-oxides to metallic iron according to claim 22, also comprising a preheater device, connected to the inlet of said feeding pipe.

26. An apparatus for reducing iron-oxides to metallic iron according to claim 25, wherein said preheater device is located inside the vertical reactor.

* * * * *